US005723274A

United States Patent [19]

Anderson et al.

[11] Patent Number: 5,723,274

[45] Date of Patent: Mar. 3, 1998

[54] FILM FORMER AND NON-FILM FORMER COATING COMPOSITION FOR IMAGING ELEMENTS

[75] Inventors: Charles Chester Anderson; Yongcai Wang, both of Penfield, N.Y.

[73] Assignee: Eastman Kodak Company, Rochester, N.Y.

[21] Appl. No.: 712,010

[22] Filed: Sep. 11, 1996

[51] Int. Cl.$^6$ .............................. G03C 1/89; G03C 1/93; G03C 1/053; B32B 27/30

[52] U.S. Cl. .......................... 430/528; 430/215; 430/263; 430/527; 430/529; 430/536; 430/537; 430/627; 430/961; 428/500; 428/522

[58] Field of Search .................................... 430/536, 537, 430/529, 215, 961, 627, 263, 527, 528; 428/500, 522

[56] References Cited

U.S. PATENT DOCUMENTS

| | | | |
|---|---|---|---|
| 3,895,949 | 7/1975 | Akamatsu et al. | 430/273 |
| 4,497,917 | 2/1985 | Upson et al. | 430/523 |
| 4,954,559 | 9/1990 | Den Hartog et al. | 524/507 |
| 5,166,254 | 11/1992 | Nickle et al. | 524/512 |
| 5,204,404 | 4/1993 | Werner et al. | 524/501 |
| 5,219,916 | 6/1993 | Den Hartog et al. | 524/515 |
| 5,314,945 | 5/1994 | Nickle et al. | 524/507 |
| 5,366,855 | 11/1994 | Anderson et al. | 430/530 |
| 5,447,832 | 9/1995 | Wang et al. | 430/523 |

OTHER PUBLICATIONS

Journal of Applied Polymer Science, vol. 39, pp. 2119–2128 (1990).

*Primary Examiner*—Richard L. Schilling
*Attorney, Agent, or Firm*—Carl F. Ruoff

[57] ABSTRACT

The present invention is an imaging element which includes a support and at least one layer formed from, (A) film forming binder, and (B) non-film forming polymeric particles. The film forming binder is formed from a coating solution of carboxylic acid containing vinyl polymer or copolymer having a glass transition temperature of greater than 50° C. and an acid number of 60 to 260, the carboxylic acid containing vinyl polymer or copolymer is reacted with ammonia or amine so that the coating solution has a pH of from 7 to 10.

14 Claims, No Drawings

FILM FORMER AND NON-FILM FORMER COATING COMPOSITION FOR IMAGING ELEMENTS

This application relates to commonly assigned copending application Ser. No. 08/712,019, Express Mail No. TB44098559X which is filed simultaneously herewith and hereby incorporated by reference for all that it discloses. This application relates to commonly assigned copending Ser. No. 08/712,006, Express Mail No. TB440987360 which is filed simultaneously and hereby incorporated by reference for all that it discloses. This application relates to commonly assigned copending application Ser. No. 08/712,018, Express Mail No. TB440987349 which is filed simultaneously herewith and hereby incorporated by reference for all that it discloses. This application relates to commonly assigned copending application Ser. No. 08/712,017, Express Mail No. TB440987371 which is filed simultaneously herewith and hereby incorporated by reference for all that it discloses. This application relates to commonly assigned copending application Ser. No. 08/712,016, Express Mail No. TB440987404 which is filed simultaneously herewith and hereby incorporated by reference for all that it discloses.

FIELD OF THE INVENTION

This invention relates in general to imaging elements, and in particular to imaging elements comprising a support material containing at least one layer coated from an aqueous coating solution containing a film forming binder comprising a carboxylic acid containing vinyl polymer or copolymer and non-film-forming, water dispersible polymer particles. The invention provides coating compositions that have improved manufacturing and film forming characteristics compared to the related art described in U.S. Pat. Nos. 5,366,855 and 5,477,832. The coated layer exhibits superior physical properties including exceptional transparency and resistance to scratches, abrasion, blocking, and ferrotyping. In addition, coatings of the present invention provide a reduction in the amount of volatile organic compounds emitted during the drying process, and are, therefore, more attractive from an environmental standpoint.

BACKGROUND OF THE INVENTION

Support materials for an imaging element often employ layers comprising glassy, hydrophobic polymers such as polyacrylates, polymethacrylates, polystyrenes, or cellulose esters, for example. One typical application for such a layer is as a backing layer to provide resistance to scratches, abrasion, blocking, and ferrotyping. The latter two properties relate to the propensity of layers applied onto the support material or imaging element to stick together as a result of the adverse humidity, temperature, and pressure conditions that may occur during the manufacture and use of the imaging element.

These glassy polymers are typically coated from organic solvent-based solutions to yield a continuous film upon evaporation of the solvent. However, because of environmental considerations it is desirable to replace organic solvent-based coating formulations with water-based coating formulations. The challenge has been to develop water-based coatings that provide similar physical and chemical properties in the dried film that can be obtained with organic-solvent based coatings.

Water insoluble polymer particles contained in aqueous latexes and dispersions reported to be useful for coatings on photographic films typically have low glass transition temperatures (Tg) to insure coalescence of the polymer particles into a strong, continuous film. Generally the Tg of such polymers is less than 50° C. Typically these polymers are used in priming or "subbing" layers which are applied onto the film support to act as adhesion promoting layers for photographic emulsion layers. Such low Tg polymers, although useful when they underlay an emulsion layer, are not suitable as, for example, backing layers since their blocking and ferrotyping resistance are poor. To fully coalesce a polymer latex with a higher Tg requires significant concentrations of coalescing aids. This is undesirable for several reasons. Volatilization of the coalescing aid as the coating dries is not desirable from an environmental standpoint. In addition, subsequent recondensation of the coalescing aid in the cooler areas of the coating machine may cause coating imperfections and conveyance problems. Coalescing aid which remains permanently in the dried coating will plasticize the polymer and adversely affect its resistance to blocking, ferrotyping, and abrasion.

An approach reported to provide aqueous coatings that require little or no coalescing aid is to use core-shell latex polymer particles. A soft (low Tg) shell allows the polymer particle to coalesce and a hard (high Tg) core provides the desirable physical properties. The core-shell polymers are prepared in a two-stage emulsion polymerization process. The polymerization method is non-trivial and heterogeneous particles that contain the soft polymer infused into the hard polymer, rather than a true core-shell structure, may result (Journal of Applied Polymer Science, Vol. 39, page 2121, 1990). Aqueous coating compositions comprising core-shell latex polymer particles and use of such coalescing aid-free compositions as ferrotyping resistant layers in photographic elements are disclosed in Upson and Kestner U.S. Pat. No. 4,497,917 issued Feb. 5, 1985. The polymers are described as having a core with a Tg of greater than 70° C. and a shell with a Tg from 25° to 60° C.

U.S. Pat. Nos. 5,366,855 and 5,477,832 describe for imaging elements a coalesced layer comprising film-forming colloidal polymer particles and non-film forming colloidal polymer particles. Those layers are coated from aqueous medium and contain polymer particles of both high and low glass transition temperatures. Typically, the film forming colloidal polymer particles consist of low Tg polymers, and are present in the coated layers from 20 to 70 percent by weight. The inclusion of these low Tg particles allows the coating compositions to form a transparent film without the presence of a coalescing aid. However, this low Tg polymer may impact the high temperature performance of these layers, for example, the ability of the layer to resist blocking and ferrotyping.

U.S. Pat. No. 3,895,949 describes a photosensitive element having a layer of photosensitive material that is overcoated with a protective layer containing a copolymer obtained by reaction between about 10 to 70 percent by weight of an unsaturated carboxylic acid and at least one ethylenically unsaturated compound comprising up to 40 percent by weight of a hard component such as styrene or methyl methacrylate and about 50 to 30 percent by weight of a soft component such as ethyl acrylate, or butyl acrylate. Polymer particles that have such compositions are of low Tg, and therefore can coalesce and form a transparent film very easily under normal drying conditions used for manufacturing photographic elements. However, such low Tg polymers are not suitable as, for example, backing layers since their blocking and ferrotyping resistance are poor.

U.S. Pat. Nos. 5,166,254 and 5,129,916 describe a water-based coating composition containing mixtures of an acrylic latex and an acrylic hydrosol. The acrylic latex contains 1 to 15% of methylol (meth)acrylamide, 0.5 to 10% carboxylic acid containing monomer, and 0.5 to 10% hydroxyl containing monomer, and has a Tg of from −40° to 40° C. and a molecular weight of from 500,000 to 3,000,000. U.S. Pat. Nos. 5,314,945 and 4,954,559 describe a water-based coating composition containing an acrylic latex and a polyurethane. The acrylic latex contains 1 to 10% of methylol (meth)acrylamide, 0.5 to 10% carboxylic acid containing monomer, and 0.5 to 10% hydroxyl containing monomer, and has a Tg of from −40° to 40° C. and a molecular weight of from 500,000 to 3,000,000. U.S. Pat. No. 5,204,404 describes a water-based coating composition containing a mixture of a dispersed acrylic silane polymer and a polyurethane. The acrylic silane polymer prepared by emulsion polymerization contains 1 to 10% of silane containing acrylates, 0.1 to 10% of carboxylic acid containing monomer, and 2 to 10% of hydroxyl containing monomer. The polymer has a Tg of from −40° to 25° C. and a molecular weight of from 500,000 to 3,000,000.

Film formation from a coating composition in general involves the deposition of a coating liquid onto a substrate and its transformation into an adherent solid coating. During such a process, the solvent must be removed without adversely affecting the performance properties of the coating and without introducing defects into the coating. The drying step is therefore extremely important in defect formation because it is the last step in the process where the chemistry and physical properties of the product can be affected. For a perfect solid coating to form, the film must remain liquid long enough after deposition to allow the surface defects to flow out and disappear. However, if the wet coating remains as a low viscosity liquid for too long a time period, non-uniform airflow in the dryer can cause non-uniform flow of the wet coating at the surface, resulting in the formation of so-called drying mottle. Drying mottle is defined as an irregularly patterned defect that can be gross, and at times it can have an iridescent pattern. The iridescence pattern is very objectionable to a customer. For example, in the case of microfilm, customers normally view the image as the film is lighted from the backside. If the backing layer exhibits an iridescence pattern, it can have a deleterious effect on the ability of a customer to view the image.

For coating compositions comprising solution polymers, the viscosity of the coating during drying is a strong function of polymer concentration. Their film formation ability is therefore very good, the dried film is uniform, and its surface is fairly smooth. For aqueous coating compositions comprising water insoluble polymer particles, the viscosity build-up during drying is a very slow function of solids. The wet coating surface is therefore very prone to air disturbance and to surface tension forces. Consequently, films formed from aqueous coating compositions comprising water insoluble polymer particles often exhibit an objectionable iridescence pattern.

Film formation from aqueous coating compositions comprising water insoluble polymer particles also involves particle packing and deformation. Particles have to experience a significant amount of deformation to form a continuous, transparent film. The pressure profile due to particle elastic deformation is such that the particle is in compression at the center of the particle and in tension at the edges. As long as there is no polymer flow or polymer chain diffusion across the particle—particle interface, as is the case in photographic support coating applications due to very limited dryer length and very short drying time, the particle—particle interface is very weak, and internal stress will tend to separate the particles along that interface. Unless the dried coating experiences further heat relaxation at high temperature, the internal stress will persist and result in adhesion failure at the particle—particle interface or the particle-substrate interface.

In recent years, the conditions under which imaging elements are manufactured and utilized have become even more severe. This is either because applications for imaging elements have been extended to more severe environments or conditions, for example, higher temperatures must be withstood during manufacturing, storage, and use, or because manufacturing and processing speeds have been increased for greater productivity. Under these conditions, the above mentioned methods to obtain aqueous coating compositions free of organic solvents become deficient with regard to simultaneously satisfying all of the physical, chemical, and manufacturing requirements for an aqueous coating for imaging applications. For example, the image elements are more severely scratched during high speed finishing processes or in order to improve the dimensional stability of the imaging element the film support may be annealed at high temperature to modify the core set characteristics of, for example, a polyester film base. A foremost objective of the present invention is therefore to provide an aqueous coating composition which is essentially free of organic solvent, has excellent film forming characteristics under drying conditions used for imaging support manufacturing processes, and forms a dried layer free of drying mottle and with excellent resistance to physical scratch and abrasion, and to sticking and ferrotyping even at high temperatures.

SUMMARY OF THE INVENTION

In accordance with the present invention, an image element comprises a support having thereon at least one layer coated from an aqueous coating solution having therein a film-forming binder and non-film-forming, polymer particles. The film-forming binder polymer is a carboxylic acid containing vinyl polymer or copolymer having a glass transition temperature of greater than 50° C. and an acid number of from 60 to 260. The carboxylic acid groups of the film-forming binder polymer are reacted with ammonia or amine to provide a pH of the composition of about 7 to 10.

DESCRIPTION OF THE INVENTION

The imaging elements to which this invention relates can be any of many different types depending on the particular use for which they are intended. Such elements include, for example, photographic, electrostatographic, photothermographic, migration, electrothermographic, dielectric recording, and thermal dye transfer imaging elements.

The support material used in this invention can comprise various polymeric films, papers, glass, and the like, but both acetate and polyester supports well known in the art are preferred. The thickness of the support is not critical. Support thicknesses of 2 to 10 mil (0.002 to 0.010 inches) can be used. The polyester support typically employs an undercoat or subbing layer well known in the art that comprises, for example, for polyester support a vinylidene chloride/methyl acrylate/itaconic acid terpolymer or vinylidene chloride/acrylonitrile/acrylic acid terpolymer. The layers of this invention can be employed as subbing layers, interlayers, overcoat layers, backing layers, receiving layers, barrier layers, timing layers, antihalation layers, antistatic layers, stripping layers, transparent magnetic layers, protective overcoats for antistatic layers, and the like. The layers in accordance with this invention are particularly advantageous due to superior physical properties including exceptional transparency and toughness necessary for providing resistance to scratches, abrasion, blocking, and ferrotyping.

The coating composition of the invention comprises a continuous aqueous phase having therein a mixture of film-forming polymer binder (component A) and non-film-forming polymer particles (component B). Component A comprises 20 to 95%, preferably 30 to 70% of the total weight of components A and B.

The non-film-forming polymer particles (B) comprise glassy polymers that provide resistance to blocking, ferrotyping, abrasion, and scratches. These polymers include addition-type polymers and interpolymers prepared from ethylenically unsaturated monomers such as acrylates including acrylic acid, methacrylates including methacrylic acid, acrylamides and methacrylamides, itaconic acid and its half esters and diesters, styrenes including substituted styrenes, acrylonitrile and methacrylonitrile, vinyl acetates, vinyl ethers, vinyl and vinylidene halides, and olefins. In addition, crosslinking and graft-linking monomers such as 1,4-butyleneglycol methacrylate, trimethylolpropane triacrylate, allyl methacrylate, diallyl phthalate, divinyl benzene, and the like may be used. The polymeric particles (B) may include reactive functional groups capable of forming covalent bonds by intermolecular crosslinking or by reaction with a crosslinking agent. Suitable reactive functional groups include: hydroxyl, carboxyl, carbodiimide, epoxide, aziridine, vinyl sulfone, sulfinic acid, active methylene, amino, amide, allyl, and the like. The colloidal polymeric particles can be prepared either by emulsion polymerization or by emulsifying pre-formed polymers in water with a proper dispersing agent. Polymer particles suitable for component B are further defined by the following test. An aqueous coating formulation containing 3 weight % polymer latex or dispersion is applied onto a transparent substrate, for example a thin sheet of polyethylene terephthalate film support, at a wet coverage of about 10 cc/$m^2$ and then dried for 2 minutes at 75° C. Non-film-forming polymer particles are defined as those that do not give transparent, continuous films upon drying. The average particle size of component B is 10 to 500 nm, preferably 10 to 200 nm.

The film-forming polymer binder (A) comprises a carboxylic acid containing vinyl interpolymer having a glass transition temperature of greater than 50° C. and an acid number of from 60 to 260, preferably from 60 to 150. Acid number is in general determined by titration and is defined as the number of milligrams of KOH required to neutralize 1 gram of the polymer. The carboxylic acid groups of the interpolymer are reacted with ammonia or amine to provide a pH of the coating composition of about 7 to 10. The glass transition temperature of the polymer is measured before neutralization of its carboxylic acid groups with ammonia or amine. Preferably, the vinyl polymer has a glass transition temperature of greater than 70° C. If the glass transition temperature of the polymer is low, the coated layer may have poor blocking and ferrotyping behavior at high temperatures, for example, during annealing of the film support to improve dimensional stability. If the acid number of the polymer is less than 60, the resultant coating does not form a transparent film. If the acid number of the polymer is larger than 260, the resultant aqueous coating has a high viscosity, and gives a dried layer having poor water resistance. The film-forming polymer binders described herein give transparent, continuous films when an aqueous coating formulation comprising 3 weight % of the film-forming polymer having a pH of 7 to 10 is applied onto a sheet of transparent support material at a wet coverage of 10 cc/$m^2$ and dried for 2 minutes at 75° C.

The vinyl polymers useful for component A in the present invention include those obtained by interpolymerizing one or more ethylenically unsaturated monomers containing carboxylic acid groups with other ethylenically unsaturated monomers including, for example, alkyl esters of acrylic or methacrylic acid such as methyl methacrylate, ethyl methacrylate, butyl methacrylate, ethyl acrylate, butyl acrylate, hexyl acrylate, n-octyl acrylate, lauryl methacrylate, 2-ethylhexyl methacrylate, nonyl acrylate, benzyl methacrylate, the hydroxyalkyl esters of the same acids such as 2-hydroxyethyl acrylate, 2-hydroxyethyl methacrylate, and 2-hydroxypropyl methacrylate, the nitrile and amides of the same acids such as acrylonitrile, methacrylonitrile, and methacrylamide, vinyl acetate, vinyl propionate, vinylidene chloride, vinyl chloride, and vinyl aromatic compounds such as styrene, t-butyl styrene and vinyl toluene, dialkyl maleates, dialkyl itaconates, dialkyl methylene-malonates, isoprene, and butadiene. Suitable ethylenically unsaturated monomers containing carboxylic acid groups include acrylic monomers such as acrylic acid, methacrylic acid, ethacrylic acid, itaconic acid, maleic acid, fumaric acid, monoalkyl itaconate including monomethyl itaconate, monoethyl itaconate, and monobutyl itaconate, monoalkyl maleate including monomethyl maleate, monoethyl maleate, and monobutyl maleate, citraconic acid, and styrenecarboxylic acid.

When the polymerization is carried out using a hydroxyl-containing monomer such as a $C_2$–$C_8$ hydroxyalkyl ester of acrylic or methacrylic acid, a vinyl polymer containing a hydroxyl group as well as a carboxyl group can be obtained.

The vinyl polymers useful for component A according to the present invention may be prepared by conventional solution polymerization methods, bulk polymerization methods, emulsion polymerization methods, suspension polymerization methods, or dispersion polymerization methods. The polymerization process is initiated in general with free radical initiators. Free radicals of any sort may be used. Preferred initiators include persulfates (such as ammonium persulfate, potassium persulfate, etc.), peroxides (such as hydrogen peroxide, benzoyl peroxide, cumene hydroperoxide, tertiary butyl peroxide, etc.), azo compounds (such as azobiscyanovaleric acid, azoisobutyronitrile, etc.), and redox initiators (such as hydrogen peroxide-iron(II) salt, potassium persulfate-sodium hydrogen sulfate, etc.). Common chain transfer agents or mixtures thereof known in the art, such as alkyl-mercaptans, can be used to control the polymer molecular weight.

When solution polymerization is employed, examples of suitable solvent medium include ketones such as methyl ethyl ketone, methyl butyl ketone, esters such as ethyl acetate, butyl acetate, ethers such as ethylene glycol monobutyl ether, and alcohols such as 2-propanol, 1-butanol. The resultant vinyl polymer can be redispersed in water by neutralizing with an amine or ammonia. The organic solvent is then removed by heating or distillation. In this regard, organic solvents which are compatible with water are preferred to be used as reaction medium during solution polymerization. Suitable examples of amines which can be used in the practice of the present invention include diethyl amine, triethyl amine, isopropyl amine, ethanolamine, diethanolamine, and morpholine.

A preferred method of preparing the vinyl polymer useful for component A of the present invention is by an emulsion polymerization process where ethylenically unsaturated monomers are mixed together with a water soluble initiator and a surfactant. The emulsion polymerization process is well known in the art (see, for example, Padget, J. C., in *Journal of Coating Technology*, Vol 66, No. 839, pages 89–105, 1994; El-Aasser, M. S. and Fitch, R. M. Ed, *Future Directions in Polymer Colloids*, NATO ASI Series, No 138, Martinus Nijhoff Publishers, 1987; Arshady, R., *Colloid & Polymer Science*, 1992, No 270, pages 717–732; Odian, G., *Principles of Polymerization*, 2nd Ed. Wiley(1981); and Sorenson, W. P. and Campbell, T. W., *Preparation Method of Polymer Chemistry*, 2nd Ed, Wiley (1968)). The polymerization process is initiated with free radical initiators. Free radicals of any sort can be used. Preferred initiators include those already described. Surfactants which can be used include, for example, a sulfate, a sulfonate, a cationic compound, an amphoteric compound, or a polymeric protective colloid. Specific examples are described in "McCUTCHEON'S Volume 1: Emulsifiers & Detergents, 1995, North American Edition".

Crosslinking comonomers can be used in the emulsion polymerization to lightly crosslink the emulsion polymer. It is prefered to keep the level of the crosslinking monomers low so as not to affect the polymer film forming characteristics. Preferred crosslinking comonomers are monomers which are polyfunctional with respect to the polymerization reaction, including esters of unsaturated monohydric alcohols with unsaturated monocarboxylic acids, such as allyl methacrylate, allyl acrylate, butenyl acrylate, undecenyl acrylate, undecenyl methacrylate, vinyl acrylate, and vinyl methacrylate, dienes such as butadiene and isoprene, esters of saturated glycols or diols with unsaturated monocarboxylic acids, such as ethylene glycol diacrylate, ethylene glycol dimethacrylate, triethylene glycol dimethacrylate, 1,4-butanediol dimethacrylate, 1,3-butanediol dimethacrylate, and polyfunctuional aromatic compounds such as divinyl benzene.

The coating composition in accordance with the invention may also contain suitable crosslinking agents which can react with carboxylic acid groups or hydroxyl groups including epoxy compounds, polyfunctional aziridines, methoxyalkyl melamines, triazines, polyisocyanates, carbodiimides, and the like.

Matte particles well known in the art may also be used in the coating composition of the invention, such matting agents have been described in *Research Disclosure* No. 308119, published December 1989, pages 1008 to 1009. When polymer matte particles are employed, the polymer may contain reactive functional groups capable of forming covalent bonds with the binder polymer by intermolecular crosslinking or by reaction with a crosslinking agent in order to promote improved adhesion of the matte particles to the coated layers. Suitable reactive functional groups include: hydroxyl, carboxyl, carbodiimide, epoxide, aziridine, vinyl sulfone, sulfinic acid, active methylene, amino, amide, allyl, and the like.

The coating composition of the present invention may also include lubricants or combinations of lubricants to reduce the sliding friction of the photographic elements in accordance with the invention. Typical lubricants include (1) silicone based materials disclosed, for example, in U.S. Pat. Nos. 3,489,567; 3,080,317; 3,042,522; 4,004,927; and 4,047,958; and in British Patent Nos. 955,061 and 1,143,118; (2) higher fatty acids and derivatives, higher alcohols and derivatives, metal salts of higher fatty acids, higher fatty acid esters, higher fatty acid amides, polyhydric alcohol esters of higher fatty acids, etc disclosed in U.S. Pat. Nos. 2,454,043; 2,732,305; 2,976,148; 3,206,311; 3,933,516; 2,588,765; 3,121,060; 3,502,473; 3,042,222; and 4,427,964; in British Patent Nos. 1,263,722; 1,198,387; 1,430,997; 1,466,304; 1,320,757; 1,320,565; and 1,320,756; and in German Patent Nos. 1,284,295 and 1,284,294; (3) liquid paraffin and paraffin or wax like materials such as carnauba wax, natural and synthetic waxes, petroleum waxes, mineral waxes and the like; (4) perfluoro- or fluoro- or fluorochloro-containing materials, which include poly(tetrafluoroethlyene), poly(trifluorochloroethylene), poly(vinylidene fluoride, poly(trifluorochloroethylene-co-vinyl chloride), poly(meth)acrylates or poly(meth)acrylamides containing perfluoroalkyl side groups, and the like. Lubricants useful in the present invention are described in further detail in *Research Disclosure* No. 308119, published December 1989, page 1006.

Other additional compounds may be added to the coating composition, depending on the functions of the particular layer, including surfactants, emulsifiers, coating aids, rheology modifiers, inorganic fillers such as conductive or nonconductive metal oxide particles, pigments, magnetic particles, biocide, and the like. The coating composition may also include a small amount of organic solvent, preferably the concentration of organic solvent is less than 1 percent by weight of the total coating composition.

The coating composition of the invention can be applied by any of a number of well known techniques, such as dip coating, rod coating, blade coating, air knife coating, gravure coating and reverse roll coating, extrusion coating, slide coating, curtain coating, and the like. After coating, the layer is generally dried by simple evaporation, which may be accelerated by known techniques such as convection heating. Known coating and drying methods are described in further detail in *Research Disclosure* No. 308119, Published December 1989, pages 1007 to 1008.

In a particularly preferred embodiment, the imaging elements of this invention are photographic elements, such as photographic films, photographic papers or photographic glass plates, in which the image-forming layer is a radiation-sensitive silver halide emulsion layer. Such emulsion layers typically comprise a film-forming hydrophilic colloid. The most commonly used of these is gelatin and gelatin is a particularly preferred material for use in this invention. Useful gelatins include alkali-treated gelatin (cattle bone or hide gelatin), acid-treated gelatin (pigskin gelatin) and gelatin derivatives such as acetylated gelatin, phthalated gelatin and the like. Other hydrophilic colloids that can be utilized alone or in combination with gelatin include dextran, gum arabic, zein, casein, pectin, collagen derivatives, collodion, agar-agar, arrowroot, albumin, and the like. Still other useful hydrophilic colloids are water-soluble polyvinyl compounds such as polyvinyl alcohol, polyacrylamide, poly(vinylpyrrolidone), and the like.

The photographic elements of the present invention can be simple black-and-white or monochrome elements comprising a support bearing a layer of light-sensitive silver halide emulsion or they can be multilayer and/or multicolor elements.

Color photographic elements of this invention typically contain dye image-forming units sensitive to each of the three primary regions of the spectrum. Each unit can be comprised of a single silver halide emulsion layer or of multiple emulsion layers sensitive to a given region of the spectrum. The layers of the element, including the layers of the image-forming units, can be arranged in various orders as is well known in the art.

A preferred photographic element according to this invention comprises a support bearing at least one blue-sensitive silver halide emulsion layer having associated therewith a yellow image dye-providing material, at least one green-sensitive silver halide emulsion layer having associated therewith a magenta image dye-providing material and at least one red-sensitive silver halide emulsion layer having associated therewith a cyan image dye-providing material.

In addition to emulsion layers, the photographic elements of the present invention can contain one or more auxiliary layers conventional in photographic elements, such as overcoat layers, spacer layers, filter layers, interlayers, antihalation layers, pH lowering layers (sometimes referred to as acid layers and neutralizing layers), timing layers, opaque reflecting layers, opaque light-absorbing layers and the like. The support can be any suitable support used with photographic elements. Typical supports include polymeric films, paper (including polymer-coated paper), glass and the like. Details regarding supports and other layers of the photographic elements of this invention are contained in *Research Disclosure,* Item 36544, September, 1994.

The light-sensitive silver halide emulsions employed in the photographic elements of this invention can include coarse, regular or fine grain silver halide crystals or mixtures thereof and can be comprised of such silver halides as silver chloride, silver bromide, silver bromoiodide, silver chlorobromide, silver chloroiodide, silver chorobromoiodide, and mixtures thereof. The emulsions can be, for example, tabular grain light-sensitive silver halide emulsions. The emulsions can be negative-working or direct positive emulsions. They can form latent images predominantly on the surface of the silver halide grains or in the interior of the silver halide grains. They can be chemically and spectrally sensitized in accordance with usual practices. The emulsions typically will be gelatin emulsions although other hydrophilic colloids can be used in accordance with usual practice. Details regarding the silver halide emulsions are contained in *Research Disclosure,* Item 36544, September, 1994, and the references listed therein.

The photographic silver halide emulsions utilized in this invention can contain other addenda conventional in the photographic art. Useful addenda are described, for example, in *Research Disclosure,* Item 36544, September, 1994. Useful addenda include spectral sensitizing dyes, desensitizers, antifoggants, masking couplers, DIE couplers, DIR compounds, antistain agents, image dye stabilizers, absorbing materials such as filter dyes and UV absorbers, light-scattering materials, coating aids, plasticizers and lubricants, and the like.

Depending upon the dye-image-providing material employed in the photographic element, it can be incorporated in the silver halide emulsion layer or in a separate layer associated with the emulsion layer. The dye-image-providing material can be any of a number known in the art, such as dye-forming couplers, bleachable dyes, dye developers and redox dye-releasers, and the particular one employed will depend on the nature of the element, and the type of image desired.

Dye-image-providing materials employed with conventional color materials designed for processing with separate solutions are preferably dye-forming couplers; i.e., compounds which couple with oxidized developing agent to form a dye. Preferred couplers which form cyan dye images are phenols and naphthols. Preferred couplers which form magenta dye images are pyrazolones and pyrazolotriazoles. Preferred couplers which form yellow dye images are benzoylacetanilides and pivalylacetanilides.

The present invention will now be described in detail with reference to examples; however, the present invention should not be limited to these examples.

The examples demonstrate the benefits of the aqueous coating compositions of the present invention, and in particular show that the coating compositions of the present invention have excellent film-forming characteristics under drying conditions typically used in the photographic support manufacturing process. The coated layer exhibits superior physical properties including exceptional transparency and resistance to scratches, abrasion, blocking, and ferrotyping.

EXAMPLES

Preparation of Carboxylic Acid Containing Vinyl Polymers and Their Film-Forming Characteristics The aqueous coating compositions used in the example coatings are prepared by first forming a carboxylic acid containing copolymer latex and mixing the latex with other components used in the coating composition.

The following shows an example of preparing an aqueous coating composition from a poly(methyl methacrylate-co-methacrylic acid) latex. It is understood other aqueous coating compositions can be prepared in a similar manner.

A stirred reactor containing 1012 g of deionized water and 3 g of Triton 770 surfactant (Rohm & Haas Co.) is heated to 80° C. and purged with $N_2$ for 1 hour. After addition of 1 g of potassium persulfate, and an emulsion containing 2.7 g of Triton 770 surfactant, 267 g of deionized water, 255 g of methyl methacrylate, 45 g of methacrylic acid, 6 g of methyl-3-mercaptopropionate chain transfer agent, and 0.5 g of potassium persulfate is slowly added over a period of 1 hour. The reaction is allowed to continue for 4 more hours before the reactor is cooled down to room temperature. The latex prepared is filtered through an ultrafine filter (5 μm cut-off) to remove any coagulum. The polymer particle so prepared has an acid number of 97.8, and a weight average molecular weight of 24,000. The latex has a pH value of 2.0–2.5.

The pH of the poly(methyl methacrylate-co-methacrylic acid) latex so prepared is then adjusted with a 20 wt % triethyl amine solution. The mixture is stirred overnight and an appropriate amount of water is added to give a final solids of about 7 wt %.

The carboxylic acid containing polymers used in the example coatings are listed in Table 1. The film forming characteristic of each polymer is defined by the following test. An aqueous coating formulation comprising 3 weight % polymer is applied onto a transparent substrate, for example a thin sheet of polyethylene terephthalate film support, at a wet coverage of about 10 cc/m$^2$ and then dried for 2 minutes at 75° C. Non-film-forming polymers are defined as those that do not give transparent, continuous films upon drying while fim-forming polymers are those that gave transparent, continuous films.

In Table 1, CTA represents methyl-3-mercaptopropionate or dedecyl mercaptan chain transfer agent used in making the vinyl polymers, MMA represents methyl methacrylate, MAA represents methacrylic acid, AA represents acrylic acid, BA represents butyl acrylate, and EMA represents ethyl methacrylate. Table 1 also shows the pH value of the coating compositions. In Table 1, all of the vinyl copolymers listed have a Tg value of greater than 50° C. As seen by the results shown, such high Tg polymers are generally non-film-forming polymers. However, when polymers having a Tg value greater than 50° C. have an acid number greater than 60 and a pH of 7–10 they readily form transparent films.

TABLE 1

| Polymer | Composition | CTA wt % | Acid Number | pH | Description |
|---|---|---|---|---|---|
| P-1 | MMA/MAA 97/3 wt % | 0 | 19.5 | 2–2.5 | Non-film-former |
| P-2 | EMA/MAA 95/5 wt % | 0 | 32.5 | 2–2.5 | Non-film-former |
| P-3 | MMA/MAA 90/10 wt % | 2 | 65.2 | 2–2.5 | Non-film-former |
| P-4 | EMA/MAA 90/10 wt % | 0 | 65.2 | 2–2.5 | Non-film-former |
| P-5 | EMA/MAA 85/15 wt % | 1 | 97.8 | 2–2.5 | Non-film-former |
| P-6 | MMA/MAA 95/5 wt % | 2 | 32.5 | 9.09 | Non-film-former |
| P-7 | MMA/BA/MAA 65/25/10 wt % | 0 | 65.2 | 2–2.5 | Non-film-former |
| P-8 | MMA/AA 92.517.5 wt % | 0 | 58.4 | 9.0 | Non-film-former |
| P-9 | MMA/BA/MAA 65/25/10 wt % | 0 | 65.2 | 9.0 | Film-former |
| P-10 | MMA/MAA 90/10 wt % | 2 | 65.2 | 9.87 | Film-former |
| P-11 | MMA/AA 90/10 wt % | 0 | 77.9 | 9.08 | Film-former |
| P-12 | MMA/AA 90/10 wt % | 2 | 77.9 | 9.46 | Film-former |
| P-13 | MMA/AA 87.5/12.5 wt % | 1 | 97.3 | 9.75 | Film-former |
| P-14 | MMA/MAA 87.5/12.5 wt % | 0 | 81.5 | 9.0 | Film-former |
| P-15 | MMA/MAA 85/15 wt % | 0 | 97.8 | 8.30 | Film-former |
| P-16 | MMA/MAA 85/15 wt % | 1 | 97.8 | 9.61 | Film-former |
| P-17 | MMA/MAA 80/20 wt % | 0 | 130.4 | 7.53 | Film-former |
| P-18 | MMA/MAA 80/20 wt % | 1 | 130.4 | 9.75 | Film-former |
| P-19 | EMA/MAA 85/15 wt % | 0 | 97.8 | 9.38 | Film-former |
| P-20 | EMA/MAA 85/15 wt % | 1 | 97.8 | 9.25 | Film-former |

Examples 1–12 and Comparative Samples A–G

Aqueous coating compositions comprising 7 weight % total solids are prepared and coated onto 4 mil thick polyethylene terephthalate film support that has been subbed with a terpolymer latex of acrylonitrile, vinylidene chloride, and acrylic acid. The coating compositions comprised various ratios of non-film-forming polymer particles to film-forming polymer particles, polyfunctional aziridine (CX100, Zeneca Resins Inc.) crosslinking agent added at 10–20 weight % of the total solids, and Triton X-100 surfactant (Rohm & Haas) added at 0.06 weight % of the total solids. The results listed in Table 2 clearly show that only coating compositions of the invention containing a film-forming binder comprising a carboxylic acid containing vinyl polymer and non-film-forming, polymer particles wherein the film-forming binder polymer has a glass transition temperature of greater than 50° C., an acid number of from 60 to 260, and the carboxylic acid groups of the film-forming binder polymer are reacted with ammonia or amine to provide a pH of the composition of about 7 to 10 gave highly transparent films.

TABLE 2

| Coating | Composition | Appearance |
|---|---|---|
| Sample A | P-1/P-2 70/30 | Hazy/White |
| Sample B | P-1/P-3 70/30 | Hazy/White |
| Sample C | P-1/P-4 70/30 | Hazy/White |
| Sample D | P-1/P-5 70/30 | Hazy/White |
| Sample E | P-1/P-6 70/30 | Hazy/White |
| Sample F | P-1/P-7 70/30 | Hazy/White |
| Sample G | P-1/P-8 70/30 | Hazy/White |
| Example 1 | P-1/P-9 70/30 | Excellent/Transparent |
| Example 2 | P-1/P-10 70/30 | Excellent/Transparent |
| Example 3 | P-1/P-11 70/30 | Excellent/Transparent |
| Example 4 | P-1/P-12 70/30 | Excellent/Transparent |
| Example 5 | P-1/P-13 70/30 | Excellent/Transparent |
| Example 6 | P-1/P-14 70/30 | Excellent/Transparent |
| Example 7 | P-1/P-15 70/30 | Excellent/Transparent |
| Example 8 | P-1/P-16 70/30 | Excellent/Transparent |

TABLE 2-continued

| Coating | Composition | Appearance |
|---|---|---|
| Example 9 | P-1/P-17 70/30 | Excellent/Transparent |
| Example 10 | P-1/P-18 70/30 | Excellent/Transparent |
| Example 11 | P-1/P-19 70/30 | Excellent/Transparent |
| Example 12 | P-1/P-20 70/30 | Excellent/Transparent |

Examples 13–21 and Comparative Sample H

The following example demonstrates the excellent physical properties that are obtained with coating compositions of the invention. A subbed polyester film support as previously described is coated with an aqueous antistatic formulation comprising 0.025 weight % of silver-doped vanadium pentoxide, 0.075 weight % of a terpolymer latex of methylacrylate, vinylidene chloride, and itaconic acid and dried at 100° C. to yield an antistatic layer having a dry weight of about 8 $mg/m^2$. Aqueous coating compositions of the invention comprising 7.0 weight percent total solids and containing polyfunctional aziridine (CX100, Zeneca Resins Inc.) crosslinking agent added at 20 weight % of the total solids and Triton X-100 surfactant (Rohm & Haas) added at 0.06 weight % of the total solids are applied onto the antistatic layer and dried at 100° C. for 2 minutes to give protective overcoat layers with a dry coating weight of 1000 $mg/m^2$.

Taber abrasion resistance determined in accordance with the procedures set forth in ASTM D1044 was measured for each sample. It is known (described in U.S. Pat. Nos. 5,006,451 and 5,221,598) that the antistatic properties of the vanadium pentoxide layer are destroyed after film processing if not protected by an impermeable barrier. Thus the permeability of the example coatings could be evaluated by measuring the antistatic properties (defined by the internal resistivity value) of a sample after processing in conventional film developing and fixing solutions. The sample is soaked in developing and fixing solutions as described in U.S. Pat. No. 4,269,929, at 38° C. for 60 seconds each and then rinsed in distilled water. The internal resistivity of the processed sample at 20% relative humidity is measured using the salt bridge method described in R. A. Elder, "Resistivity Measurements on Buried Conductive Layers", EOS/ESD Symposium Proceedings, September 1990, pp. 251–254. The description of the coatings and the results obtained are reported in Table 3.

TABLE 3

| Sample | Composition | Taber Abr % haze | Resistivity before processing log Ω/ | Resistivity after processing log Ω/ |
|---|---|---|---|---|
| Sample H | P-1/P-2 70/30 | — | 7.2 | 13 |
| Example 13 | P-1/P-8 70/30 | 9.8 | 7.1 | 7.2 |
| Example 14 | P-1/P-16 70/30 | 9.5 | 7.1 | 7.1 |
| Example 15 | P-1/P-18 70/30 | 9.1 | 7.1 | 7.2 |
| Example 16 | P-1//P-8 50/50 | 9.4 | 7.1 | 7.2 |
| Bxample 17 | P-1/P-9 50/50 | 10.8 | 7.1 | 7.4 |
| Example 18 | P-1/P-14 50/50 | 10.4 | 7.1 | 7.2 |
| Example 19 | P-1/P-15 50/50 | 7.7 | 7.1 | 7.2 |
| Bxample 20 | P-1/P-16 50/50 | 9.0 | 7.1 | 7.2 |
| Example 21 | P-1/P-18 50/50 | 8.5 | 7.1 | 7.5 |

The results shown in Table 3 show that coatings of the invention have excellent Taber abrasion resistance and protect the underlying antistatic layer from attack by the film processing solutions. Comparative sample H, on the other hand, gave a hazy coating that could not even be tested for abrasion resistance due to its poor physical properties and lack of transparency. In addition, sample H did not prevent the loss of antistatic properties after film processing since it did not form an impermeable, void-free coating.

U.S. Pat. Nos. 5,366,855 and 5,477,832 describe for imaging elements a coalesced layer comprising film-forming colloidal polymer particles and non-film forming colloidal polymer particles. Those layers are coated from aqueous medium and contain polymer particles of both high and low glass transition temperatures. Typically, the film forming colloidal polymer particles consist of low Tg polymers, and are present in the coated layers from 20 to 70 percent by weight. The inclusion of these low Tg particles allows the coating compositions to form a transparent film without the presence of a coalescing aid. However, this low Tg polymer may impact the high temperature performance of these layers, for example, the ability of the layer to resist blocking and ferrotyping.

Coating compositions described in the '855 and '832 patents are prepared and applied over the vanadium pentoxide-containing antistatic layer described above. The coatings are dried at 100° C. to give protective overcoat layers with a dry coating weight of 1000 mg/ft$^2$. Comparative Sample I comprises 70 weight % non-film-forming polymer P-1 and 30 weight film-forming polyurethane dispersion (Neorez R960, sold by Zeneca Resins Inc.). Comparative Sample J comprises 50 weight % non-film-forming polymer P-1 and 50 weight % film-forming Neorez R960. The protective overcoat layer of Samples I and J also contains 10 weight % aziridine crosslinking agent. The blocking resistance for Samples I and J are compared to that for the coatings of Examples 15, 19, and 21 at temperatures of 70°, 100°, and 120° C. The blocking resistance is determined by placing two 10 cm by 10 cm samples of each film face to face (i.e., protective overcoat side against protective overcoat side) in a Carver press at the desired temperature and applying 14000 psi pressure for two minutes. The samples are then removed from the press, allowed to cool to room temperature, and the degree to which the samples stuck together when they are separated is rated on a scale of 0 to 5 (increasing number means more sticking/poorer blocking resistance; 0=no sticking, . . . , 5=could not be separated). The blocking resistance results are listed in Table 4.

TABLE 4

| Coating | Blocking Rating 70° C. | 100° C. | 120° C. |
|---|---|---|---|
| Sample I | 1 | 2 | 4 |
| Sample J | 1 | 2 | 3 |
| Example 15 | 0 | 1 | 1 |
| Example 19 | 0 | 1 | 1 |
| Example 21 | 0 | 1 | 1 |

The results clearly show the superior resistance to blocking, especially at high temperature, that is obtained for coating compositions of the invention compared to the prior art.

While there has been shown and described what are at present considered to be the preferred embodiments of the invention, it will be obvious to those skilled in the art that various alterations and modifications may be made therein without departing from the scope of the invention. All such modifications are intended to be included in the present invention.

We claim:

1. An imaging element comprising a support having thereon at least one layer formed from an aqueous coating composition having dispersed therein (A) a film forming binder and (B) non-film forming polymeric particles said film forming binder comprising a carboxylic acid containing vinyl polymer having a glass transition temperature of greater than 50° C. and an acid number of from 60 to 260, the carboxylic acid containing polymer is reacted with ammonia or amine so that the coating composition has a pH of from 7 to 10.

2. The imaging element of claim 1 wherein said film forming binder comprises 20 to 95 weight percent of both said film forming binder and said non-film forming polymeric particles.

3. The imaging element of claim 1 wherein the carboxylic acid containing polymer is obtained by interpolymerizing one or more enthylenically unsaturated monomers containing carboxylic acid groups with other ethylenically unsaturated monomers.

4. The imaging element of claim 3 wherein the ethylenically unsaturated monomers containing carboxylic acid groups are selected from the group consisting of acrylic monomers, monoalkyl itaconates, monoalkyl maleates, citaconic acid and styrene carboxylic acid.

5. The imaging element of claim 3 wherein the other ethylenically unsaturated monomers are selected from the group consisting of alkyl esters of acrylic acid, alkyl esters of methacrylic acid, hydroxyalkyl esters of acrylic acid, hydroxyalkyl esters of methacrylic acid, nitriles of acrylic acid, nitriles of methacrylic acid, amides of acrylic acid, amides of methacrylic acid, vinyl acetate, vinyl propionate, vinylidene chloride, vinyl chloride, vinyl aromatic compounds, dialkyl mateates, dialkyl itaconics, dialkyl methylene-malonates, isoprene and butadiene.

6. The imaging element of claim 1 wherein said non-film forming polymeric particles are particles of an addition type polymer or interpolymer prepared from ethylenically unsaturated monomers and include functional groups selected from the group consisting of hydroxyl, carboxyl, carbodiimide, epoxide, aziridene, vinyl sulfone, sulfuric acid, active methylene, amino, amide and allyl.

7. The imaging element of claim 1 wherein said at least one layer is a barrier layer overlying an antistatic layer comprising vanadium pentoxide.

8. The imaging element of claim 1 further comprising a crosslinker.

9. The imaging element of claim 1 further comprising a lubricant.

10. The imaging element of claim 1 further comprising matte particles.

11. The imaging element of claim 1 wherein said at least one layer comprises an outermost layer.

12. The imaging element of claim 1 wherein the acid number is from 60 to 150.

13. The imaging element of claim 1 wherein the aqueous coating composition comprises conductive materials.

14. The imaging element of claim 1 wherein the aqueous coating composition comprises magnetic recording materials.

* * * * *